United States Patent

Kato et al.

Patent Number: 5,190,992
Date of Patent: Mar. 2, 1993

[54] PHOTOCURABLE RESIN COMPOSITION FOR GLASS LAMINATION

[75] Inventors: Toshiyuki Kato; Syunzi Ito; Tsunehiko Shimizui, all of Machida, Japan

[73] Assignee: Denki Kagaku Kogyo Kabushiki Kaisha, Tokyo, Japan

[21] Appl. No.: 769,480

[22] Filed: Oct. 1, 1991

Related U.S. Application Data

[63] Continuation of Ser. No. 190,169, May 4, 1988, abandoned.

[30] Foreign Application Priority Data

May 13, 1987 [JP] Japan ................ 62-116455
May 13, 1987 [JP] Japan ................ 62-116456
Aug. 6, 1987 [JP] Japan ................ 62-195364

[51] Int. Cl.$^5$ ............... C08F 2/50; C08F 16/32; C08G 75/12
[52] U.S. Cl. .................. 522/180; 522/167; 522/181; 528/367; 528/376; 528/360; 526/320
[58] Field of Search ................ 522/181, 180

[56] References Cited

U.S. PATENT DOCUMENTS

| | | | |
|---|---|---|---|
| 3,729,403 | 4/1973 | Kehr | 522/1 |
| 4,272,586 | 6/1981 | Ando et al. | 428/419 |
| 4,274,933 | 6/1981 | Kamada et al. | 264/22 |
| 4,382,135 | 5/1983 | Sinka | 522/181 |
| 4,495,271 | 1/1985 | Geissler | 430/288 |
| 4,512,910 | 4/1985 | Schmidle | 522/181 |
| 4,599,274 | 7/1986 | Ando et al. | 428/442 |

FOREIGN PATENT DOCUMENTS

| | | |
|---|---|---|
| 3303784 | 8/1983 | Fed. Rep. of Germany . |
| 2172387 | 9/1973 | France . |
| 242051 | 5/1985 | German Democratic Rep. . |
| 51-149770 | 3/1976 | Japan . |

OTHER PUBLICATIONS

Search Report for European Patent Application 88107521.2.

Primary Examiner—Marion E. McCamish
Assistant Examiner—Arthur H. Koeckert
Attorney, Agent, or Firm—Oblon, Spivak, McClelland, Maier & Neustadt

[57] ABSTRACT

A photocurable resin composition for glass lamination, consisting essentially of a radical polymerizable monomer having at least one repeating units of ethylene oxide in its molecule and terminated with allyl, acrylate or methacrylate groups, and a photopolymerization initiator, a cured product of which has a volume resistivity of less than $5 \times 10^9$ Ω·cm. Addition of a polythiol provides an ene/thiol cure.

2 Claims, 1 Drawing Sheet

PHOTOCURABLE RESIN COMPOSITION FOR GLASS LAMINATION

This application is a continuation of application Ser. No. 07/190,169, filed on May 4, 1988, now abandoned.

The present invention relates to a photocurable resin composition for glass lamination having excellent antistatic properties, flexibility and transparency, a laminated glass product having a cured product of such a photocurable resin composition as an interlayer and a process for its production.

For the production of laminated glass, it is known to bond glass to glass by means of a film of an organic polymer such as polyvinylbutral. However, when such an adhesive is employed, a complicated time-consuming process is required for the lamination.

In order to improve over the process, there has been an extensive research to develop liquid resins for glass lamination, and some of such liquid resins are practically in use.

As such resins, there may be mentioned an epoxy resin, an unsaturated polyester resin, a polyurethane resin and a silicone resin.

However, these resins usually require heat curing, and it usually takes a long time to cure them at room temperature. Thus, they have a drawback that the productivity is low.

Various photocurable resins have been known to overcome such a drawback. Typical examples include photocurable resins of acrylate type, epoxy type and ene/thiol type. They all have a feature that they are curable at room temperature in a short period of time by irradiation with ultraviolet rays or visible rays.

Among them, epoxy type photocurable resins are not suitable for glass lamination since their cured products are usually very hard and poor in flexibility, and the transparency is also not adequate.

With respect to acrylate type photocurable resins, Japanese Unexamined Patent Publication No. 48777/1974 discloses a composition containing a urethane-modified poly(meth)acrylate as the main component; Japanese Examined Patent Publication No. 8856/1977 discloses a composition containing a butadiene-modified poly(meth)acrylate as the main component; and Japanese Unexamined Patent Publication No. 166573/1984 discloses a composition containing a polyether mono(meth)acrylate as the main component. Among these acrylate photocurable resins, those containing a polyacrylate as the main component tend to undergo crosslinking during polymerization, whereby it is difficult to obtain flexible cured products. Therefore, for the purpose of glass lamination, compositions containing a monoacrylate as the main component are used (U.S. Pat. No. 4,599,274).

The ene/thiol type photocurable resins are composed essentially of a polyene and a polythiol. They have a feature that they are not susceptible to curing hindrance by air and cured products having various hardness can be obtained by adjusting the equivalent ratio of the carbon-carbon unsaturated bond (hereinafter referred to frequently as "C=C") of the polyene to the mercapto group (hereinafter referred to frequently as "—SH") of the polythiol used for the composition, or by changing the number of functional groups of the polyene or of the polythiol (Japanese Examined Patent Publication No. 3269/1972 and Japanese Unexamined patent Publication No. 162798/1979).

However, in recent years, resins for glass lamination to be used for the lamination of a non-reflecting glass on a display surface of a cathode ray tube, are required to have antistatic properties, or more specifically to have a volume resistivity of less than $5 \times 10^9$ $\Omega$·cm, to prevent various troubles due to static electricity such as adhesion of dust or electric shock. However, conventional photocurable resins are poor in antistatic properties. Therefore, in order to prevent the above-mentioned various troubles due to static electricity, it has been common to employ cumbersome and costly methods such as a method of forming a conductive coating film on the surface of the non-reflecting glass.

Under the circumstances, it is an object of the present invention to provide a photocurable resin composition, a cured product of which has excellent transparency and flexibility and has excellent antistatic properties with a volume resistivity of less than $5 \times 10^9$ $\Omega$·cm.

A further object of the present invention is to provide a laminated glass product having a cured product of such a photocurable resin composition as an interlayer to prevent antistatic troubles and a process for its production.

It has been found possible to accomplish these objects by using a radical polymerizable monomer having a certain specific chemical structure as the main component.

The present invention provides a photocurable resin composition for glass lamination, consisting essentially of a radical polymerizable monomer having at least two repeating units of ethylene oxide in its molecule and a photopolymerization initiator, a cured product of which has a volume resistivity of less than $5 \times 10^9$ $\Omega$·cm.

The present invention also provides a laminated glass product having as an interlayer a photocurable resin, a cured product of which has a volume resistivity of less than $5 \times 10^9$ $\Omega$·cm.

Further, the present invention provides a process for producing a laminated glass product, which comprises bonding a plurality of glass sheets by means of a photocurable resin, a cured product of which has a volume resistivity of less than $5 \times 10^9$ $\Omega$·cm.

Now, the present invention will be described in detail with reference to the preferred embodiments.

The photocurable resin composition of the present invention contains a radical polymerazable monomer having at least two, preferably at least four, repeating units of ethylene oxide ($-CH_2-CH_2-O-$) in its molecule. As particularly preferred specific examples, it includes (A) an acrylate composition and (B) a polyene/polythiol composition, as specified below.

Acrylate Composition (A)

A photocurable resin composition consisting essentially of the following components (1) and (2):

(1) an acrylate or methacrylate of the following formula I having an average molecular weight of from about 500 to 5000

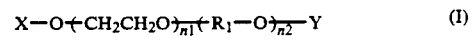

(I)

wherein each of X and Y is an acryloyl group, a methacryloyl group, a hydrogen atom, a halogen atom, an alkyl group or a substituted or unsubstituted phenyl group, $R_1$ is an aliphatic bivalent hydrocarbon group having at least 3 carbon atoms or an aromatic bivalent hydrocarbon group, n1 is an integer of at least 2, and n2 is an integer of at least 1, provided that at least one of X and Y is an acryloyl group or a methacryloyl group, (2) a photopolymerization initiator.

Polyene/Polythiol Composition (B)

A photocurable resin composition consisting essentially of a polyene, a polythiol and a photopolymerization initiator, wherein a part or whole of the polyene is a polyether poly(meth)allyl ether and/or a polyether poly(meth)acrylate having at least two repeating units of ethylene oxide in its molecule.

The monomer which may be used for the acrylate composition (A) includes, for example, glycol mono(meth)acrylate made of a block or random copolymer of ethylene oxide and propylene oxide, glycol mono(meth)acrylate made of a copolymer of ethylene oxide and tetrahydrofuran, and mono(meth)acrylates having hydrogen at the terminal hydroxyl groups of such mono(meth)acrylates substituted by a halogen atom, an alkyl group or a substituted or unsubstituted phenyl group. Such monomers may be used alone or in combination as a mixture of two or more. The monomer for the acrylate composition (A) is not limited to the above specific examples.

If the average molecular weight of such an acrylate is less than 500, there may be problems such that curing shrinkage is substantial, and the flexibility and antistatic properties of the cured product are not adequate. On the other hand, if the average molecular weight exceeds about 5000, such a monomer is difficult to prepare. A polyethylene glycol mono(meth)acrylate which is liquid at room temperature is excluded from the component (1) of the present invention since the molecular weight of such acrylate is small and if the average molecular weight is 500 or higher, it tends to be like wax at room temperature.

Further, a radical polymerizable monomer other than the acrylate of the component (1) of the present invention may be added unless such an addition does not adversely affect the object of the present invention. Such an additional monomer includes, for example, various mono acrylates such as alkyl (meth)acrylates, hydroxyalkyl (meth)acrylates, phenoxyalkyl (meth)acrylates, glycidyl (meth)acrylates, tetrahydrofurfuryl (meth)acrylates, urethane mono(meth)acrylates and dicyclopentadienyloxyethyl (meth)acrylates, and poly(meth)acrylates such as polyether di(meth)acrylates, epoxy poly(meth)acrylates, polyurethane poly(meth)acrylates, butadiene-modified poly(meth)acrylates and trimethylopropane tri(meth)acrylates.

With respect to monomers which may be used for the polyene/polythiol type composition (B), the polyene may be, for example, polyethylene glycol di(meth)allyl ether or di(meth)acrylate, glycol di(meth)allyl ether or di(meth)acrylate made of a block or random copolymer of ethylene oxide and propylene oxide, glycol di(meth)allyl ether or di(meth)acrylate made of a block or random copolymer of ethylene oxide and tetrahydrofuran, polyethylene glycol diglycidyl ether di(meth)acrylate, or a polyol poly(meth)allyl ether or poly(meth)acrylate obtained by adding at least 2 mols of ethylene oxide to 1 mol of a polyhydric alcohol such as bisphenol A, glycerol, trimethylolpropane or pentaerythritol. In each case, the one having at least two, preferably four, repeating units of ethylene oxide ($CH_2CH_2O$—) in its molecule is used. If a monomer having no or one repeating unit of ethylene oxide is used as the main component, the volume resisitivity of the cured product will be high, and the antistatic properties will be inadequate.

In the polyene/polythiol type composition of the present invention, the polyene preferably comprises compounds of the following formulas II and/or III:

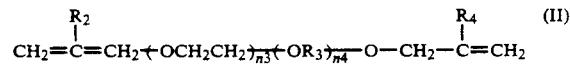

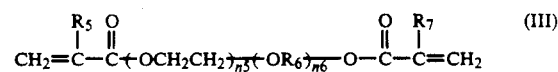

wherein each of $R_2$, $R_4$, $R_5$ and $R_7$ is a hydrogen atom or a methyl group, each of $R_3$ and $R_6$ is an aliphatic or aromatic bivalent hydrocarbon group, each of n3 and n5 is an integer of at least 2, and each of n4 and n6 is an integer of 0 or at least 1.

The polyene/polythiol type composition of the present invention contains the above polyene as an essential component. In addition to such a polyene, other polyenes may be added so long as the addition does not impair the purpose of the present invention (antistatic properties, transparency, flexibility, elasticity, etc.). Such additional polyenes include, for example, divinylbenzene, diallyl phthalate, diallyl maleate, triallyl isocyanurate, trimethylolpropane diallyl ether, pentaerithritol triallyl ether, glycerol diallyl ether, (poly)propylene glycol diallyl ether, trimethylolpropane tri(meth)acrylate, pentaerithritol tetra(meth)acrylate, dipentaerithritol hexa(meth)acrylate, 1,6-hexanediol di(meth)acrylate, various epoxy acrylates, urethane acrylates and polyester acrylates. However, additional polyenes are not limited to such specific examples.

Typical examples of the polythiol which may be used in the present invention include, for example, diglycol dimercaptan, triglycol dimercaptan, tetraglycol dimercaptan, thiodiglycol dimercaptan, thiotriglycol dimercaptan, thiotetraglycol dimercaptan, tris-(mercaptopropyl) isocyanurate, (poly)ethylene glycol dimercapto propionate, (poly)propylene glycol dimercapto propionate, tris-(2-hydroxyethyl) isocyanurate-tris-β-mercapto propionate, a polythiol commercially available under a tradename DION3-800L from Diamond Shamrock Company, and polythiol prepolymers obtainable by reacting these polythiols with polyepoxides. The amounts of the polyene and the polythiol used for the composition of the present invention are preferably such that the equivalent ratio of C=C of the polyene to the —SH of the polythiol is usually within a range of from 1.5:1 to 1:1.5, preferably from 1.2:1 to 1:1.2, more preferably about 1:1. If the amounts of the polyene and the polythiol are outside the above range, there may be problems such that the cured product has bad odor, and the hardness of the cured product tends to be too low, and in an extreme case, the composition tends to be hardly curable.

Specific examples of the photopolymerization initiator to be used in the composition of the present invention will be given below, but the initiator is not limited to such specific examples in both cases of the above (A) and (B). Namely, the photopolymerization initiator includes, for example, benzoin and its derivatives, benzil and its derivatives benzophenone and its derivatives, anthraquinone and its derivatives, acetophenone and its derivatives, diphenyldisulfide, thioxanthone and its derivatives. It is used in an amount preferably within range of from 0.01 to 5 parts by weight relative to 100% by weight of the total of the monomer used for the composition. If the amount is less than 0.01 part by weight, the curing speed tends to be slow, and if it exceeds 5 parts by weight, the strength of the cured product may decrease.

Further additives such as an antioxidant, a polymerization inhibitor, a plasticizer, a thickner, a thixotropic agent, a silane coupling agent and a dyestuff may be added to the composition of the present invention, as the case requires, in an amount not to impair the purpose of the present invention.

Another object of the present invention is to provide a laminated glass product having a cured product of the above described photocurable resin composition as an interlayer and a process for its production. Namely, a laminated glass product and a process for its production are presented whereby by bonding glass to glass or glass to a material other than glass by means of the photocurable resin composition of the present invention having a volume resistivity of less than $5 \times 10^9$ $\Omega \cdot cm$, various troubles due to static electricity are prevented without cumbersome and expensive method of e.g. forming a conductive coating film on the surface of the glass.

In the accompanying drawings, FIG. 1 is a diagrammatical view illustrating a cross section of a cathode ray tube (CRT) having glass bonded on its front surface.

Figure 2:
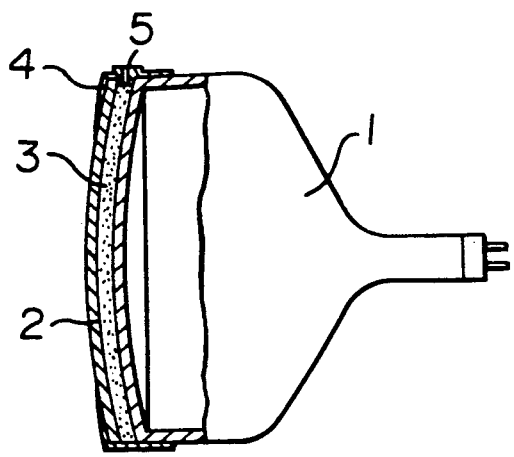
FIGS. 2 and 3 are diagrammatical views illustrating, respectively, a manner of injecting an adhesive for the production of the cathode ray tube and a manner of curing the adhesive.
Figure 3:
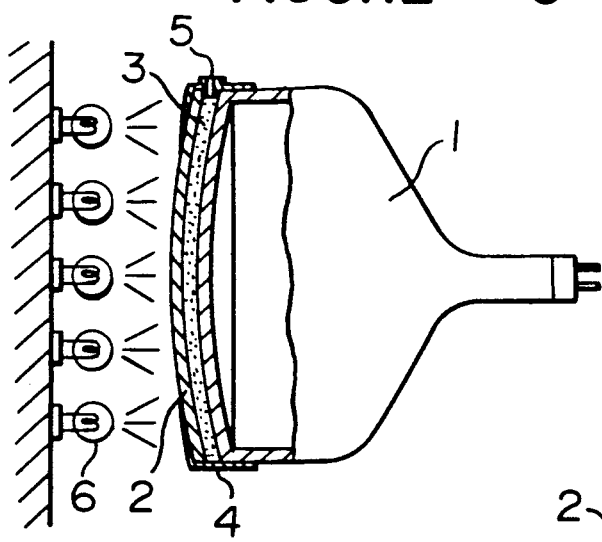
Figure 4:
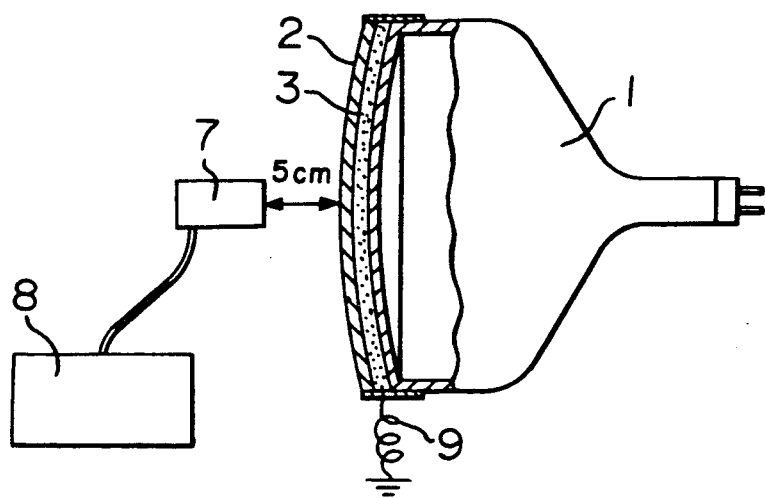
FIG. 4 is a diagrammatical view illustrating a method of measuring the charged voltages in the Examples and Comparative Examples of the present invention.

In these Figures, reference numeral 1 indicates the main body of the cathode ray tube, numeral 2 indicates the front glass, and numeral 3 indicates the adhesive layer. Referring to FIGS. 2 and 3, numeral 4 indicates an adhesive tape for sealing, numeral 5 indicates an injection inlet of the adhesive, and numeral 5 indicates an ultraviolet ray lamp. Referring to FIG. 4, numerals 7 and 8 indicate a sensor and a recorder of a static electricity measuring device, respectively, and numeral 9 indicates an earthing conductor.

Figure 1:
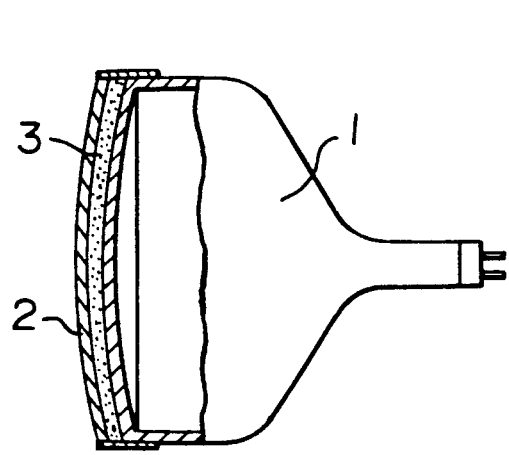

FIG. 1 is a diagrammatical view illustrating a cross section of a cathode ray tube having glass bonded to its front surface, as a typical example of the laminated glass product. FIGS. 2 and 3 illustrate a process for its production. In the present invention, the adhesive layer is composed of the above described photocurable resin having antistatic properties. A usual conventional method may be employed in other respects.

Other examples of the laminated glass product of the present invention include, for example, laminated glass for doors or windows and safety glass for automobiles or other vehicles.

Now, the present invention will be described in further detail with reference to Examples. However, it should be understood that the present invention is by no means restricted by such specific Examples. In this specification, "parts" and "%" mean "parts by weight" and "% by weight" except for indication of transmittance.

The following test methods were employed in the Examples and Comparative Examples.

1. Volume resistivity

A composition was irradiated with a ultraviolet ray of 365 nm with 4 mW/cm$^2$ for 30 minutes to obtain a cured product having a diameter of 80 mm and a thickness of 2 mm. The volume resistivity of the cured product was measured in accordance with JIS K6911.

2. Hardness

The hardness of the cured product prepared as mentioned above, was measured by Shore A hardness meter.

3. Spectral transmittance

A photocurable resin composition was injected between a pair of white glass sheets having a thickness of 3 mm to form a resin layer having a thickness of 3 mm, which was irradiated with a ultraviolet ray of 365 nm with 4 mW/cm$^2$ for 30 minutes to obtain a test piece of a pair of white glass sheets bonded to each other. The spectral transmittance of this test piece was measured by means of a spectrophotometer. The wave length of the light used for the measurement was 500 nm.

4. Measurement of charged voltages 14 inch cathode ray tubes having glass bonded to the front surface as illustrated in FIG. 1 were prepared by using the adhesives of Examples and Comparative Examples. A voltage of 25 KV was applied to the main bodies of the cathode ray tubes, whereby the charged voltage on the surface of the front glass was measured by a static electricity measuring device (FIG. 4).

The measurement of the charged voltage was conducted at two points i.e. at the time of switching on and ten seconds after switching off.

EXAMPLE 1 AND COMPARATIVE EXAMPLE 1

The compositions as identified in Table 1 were stirred and mixed at about 60° C. for one hour to obtain photocurable resin compositions, which were then subjected to various tests. The results are shown in Table 2.

TABLE 1

| Test No. | Monomer | | Photopolymerization initiator |
|---|---|---|---|
| Examples | | | |
| A-1 | Blemmer 70 PEP-800 | 100 parts | BEE 0.2 part |
| A-2 | Blemmer 55 PET-800 | 100 parts | BEE 0.2 part |
| A-3 | Blemmer 50 PMEP-800B | 100 parts | BEE 0.2 part |
| A-4 | Blemmer 55 PET-800 | 100 parts | BDK 0.2 part |
| A-5 | Blemmer 55 PET-800 | 95 parts | BDK 0.2 part |
| | 2-HEMA | 5 parts | |
| A-6 | Blemmer 55 PET-800 | 90 parts | BDK 0.2 part |
| | 2-HEMA | 10 parts | |
| A-7 | Blemmer 55 PET-800 | 80 parts | BDK 0.2 part |
| | 2-HEMA | 20 parts | |
| A-8 | Blemmer 55 PET-800 | 75 parts | BDK 0.2 part |
| | 2-HEMA | 25 parts | |
| Comparative Examples | | | |
| A'-1 | Blemmer PP-800 | 100 parts | BEE 0.2 part |
| A'-2 | 2-HEMA | 100 parts | BDK 0.2 part |

Blemmer 70 PEP-800 (manufactured by Nippon Oil & Fats Co., Ltd.): Polyethylene glycol polypropylene glycol monomethacrylate (Average molecular weight: About 800)
Blemmer 55 PET-800 (manufactured by Nippon Oil & Fats Co., Ltd.): Polyethylene glycol polytetramethylene glycol monomethacrylate (Average molecular weight: About 800)
Blemmer 50 PMEP-800B (manufactured by Nippon Oil & Fats Co., Ltd.): Methoxy polyethylene glycol polypropylene glycol monomethacrylate (Average molecular weight: About 800)
Blemmer PP-800 (manufactured by Nippon Oil & Fats Co., Ltd.): Polypropylene glycol monomethacrylate (Average molecular weight: About 800)
2-HEMA 2-Hydroxyethyl methacrylate
BEE Benzoin ethyl ether
BDK Benzil dimethyl ketal Blemmer 50 PMEP-800B (manufactured by Nippon Oil & Fats Co., Ltd.): Methoxy polyethylene glycol polypropylene glycol monomethacrylate (Average molecular weight: About 800)

Blemer pp-800 (manufactured by Nippon Oil & Fats Co., Ltd.): Polypropylene glycol monomethacrylate (Average molecular weight: About 800)
2-HEMA Hydroxyethyl methacrylate
BEE Benzoin ethyl ether
BDK Benzil dimethyl ketal

TABLE 2

Results of physical property tests

| Test No. | Volume resistivity ($\Omega \cdot cm$) | Hardness (Shore A) | Spectral transmittance (at 500 mm) |
|---|---|---|---|
| A-1 | $7.0 \times 10^8$ | 45 | 98% |
| A-2 | $8.8 \times 10^8$ | 40 | 98% |
| A-3 | $2.7 \times 10^8$ | 5 | 98% |
| A-4 | $4.7 \times 10^8$ | 46 | 98% |
| A-5 | $6.3 \times 10^8$ | 45 | 98% |
| A-6 | $7.0 \times 10^8$ | 45 | 97.6% |
| A-7 | $8.0 \times 10^8$ | 40 | 97.3% |
| A-8 | $1.2 \times 10^9$ | 40 | 96% |
| A'-1 | $1.3 \times 10^{11}$ | 40 | 97.7% |
| A'-2 | $5.1 \times 10^{10}$ | 90 | 84% |

EXAMPLE 2

0.2% of benzoin ethyl ether was dissolved in a solution obtained by mixing 230 parts of glycol diallyl ether made of a copolymer of ethylene oxide and propylene oxide commercially available under a tradename of Unisafe 50DUS-230 from Nippon Oil & Fats Co., Ltd. (average molecular weight: about 2300, copolymerization molar ratio of ethylene oxide to propylene oxide: 1:1) and 44.1 parts of tris-(2-hydroxyethyl)isocyanurate-tris-$\beta$-mercaptopropionate (THEIC-TMP) to obtain a photocurable resin composition of the present invention, which was then subjected to tests. The results are shown in Table 3.

EXAMPLE 3

A photocurable resin composition of the present invention was prepared in the same manner as in Example 2 except that 180 parts of glycol diallyl ether made of a copolymer of ethylene oxide and tetrahydrofuran commercially available under a tradename of Unisafe PKA-6203 from Nippon Oil & Fats Co., Ltd. (average molecular weight: about 1800, copolymerization molar ratio of ethylene oxide to tetrahydrofuran: 6:4) was used instead of 230 parts of Unisafe 50 DUS-230, and it was subjected to tests. The results are shown in Table 3.

EXAMPLE 4

A photocurable resin composition of the present invention was prepared in the same manner as in Example 2 except that 55 parts of polyethylene glycol dimethacrylate (average molecular weight: about 550) commercially available under a tradename of NK Ester 9G from Shinnakamura Kagaku Kogyo K.K. was used instead of 230 parts of Unisafe 50 DUS-230, and it was subjected to tests. The results are shown in Table 3.

COMPARATIVE EXAMPLE 2

A photocurable resin composition was prepared in the same manner as in Example 2 except that 300 parts of polypropylene glycol allyl ether (average molecular weight: about 3000) commercially available under a tradename of Unisafe PKA-5018 from Nippon Oil & Fats Co., Ltd. was used instead of 230 parts of Unisafe 50 DUS-230, and it was subjected to tests. The results are shown in Table 3.

COMPARATIVE EXAMPLE 3

A photocurable resin composition was prepared in the same manner as in Example 2 except that 68 parts of polypropylene glycol dimethacrylate (average molecular weight: about 680) commercially available under a tradename of NK Ester 9PG from Shinnakamura Kagaku Kogyo K.K. was used instead of 230 parts of Unisafe 50 DUS-230, and it was subjected to tests. The results are shown in Table 3.

TABLE 3

Results of physical property tests of cured products

| | Volume resistivity ($\Omega \cdot cm$) | Hardness (Shore A) | Spectral transmittance (%) |
|---|---|---|---|
| EXAMPLE 2 | $6.3 \times 10^8$ | 34 | 99 |
| EXAMPLE 3 | $7.0 \times 10^8$ | 28 | 98 |
| EXAMPLE 4 | $8.3 \times 10^8$ | 39 | 97 |
| COMPARATIVE EXAMPLE 2 | $5.0 \times 10^{10}$ | 25 | 98 |
| COMPARATIVE EXAMPLE 3 | $1.2 \times 10^{11}$ | 44 | 97 |

EXAMPLES 5 AND 6 AND COMPARATIVE EXAMPLES 4 AND 5

Ene/thiol photocurable resin compositions having an equivalent ratio of C=C to —SH of about 1:1 as shown in Table 4 were prepared, and the respective cured products were tested for the physical properties. The results are shown in Table 4.

TABLE 4

Compositions and results of physical property tests of cured products

| | EXAMPLE 5 | EXAMPLE 6 | COMPARATIVE EXAMPLE 4 | COMPARATIVE EXAMPLE 5 |
|---|---|---|---|---|
| Unisafe PKA-6203 | 630 parts | | | |
| NK Ester 9G | | 192 parts | | |
| NK Ester 1G* | | | 69.3 parts | |
| Pentaerythritol triallyl ether | 25.6 parts | 25.6 parts | 25.6 parts | 85.3 parts |
| Triglycol dimercaptan | 91 parts | 91 parts | 91 parts | 91 parts |
| Benzil dimethyl ketal | | | 0.5%** | |
| Volume resistivity ($\Omega \cdot cm$) | $4.8 \times 10^8$ | $8.2 \times 10^8$ | $1.2 \times 10^{10}$ | $3.2 \times 10^{10}$ |
| Hardness (Shore A) | 20 | 40 | 58 | more than 80 |

TABLE 4-continued

| | Compositions and results of physical property tests of cured products | | | |
|---|---|---|---|---|
| | EXAMPLE 5 | EXAMPLE 6 | COMPARATIVE EXAMPLE 4 | COMPARATIVE EXAMPLE 5 |
| Spectral transmittance (%) | 99 | 98 | 96 | 99 |

*NK Ester 1G: Ethylene glycol dimethacrylate (manufactured by Shinnakamura Kagaku Kogyo K.K.)
**% means a content in the entire composition

EXAMPLE 7

100 parts of glycol monomethacrylate made of a copolymer of ethylene oxide and propylene oxide (average molecular weight: about 800) commercially available under a tradename of Blemmer 70 PEP-800 from Nippon Oil & Fats Co., Ltd. and 0.2 part of benzoin ethyl ether were stirred and mixed at 60° C. for one hour to obtain an acrylate type photocurable resin composition (composition A).

By using composition A, the physical properties and charged voltage of the cured product were measured. For the preparation of a test piece of the cured product and a cathode ray tube, irradiation with a ultraviolet ray was conducted for 30 minutes with 4 mW/cm$^2$. The test results are shown in Tables 5 and 6.

EXAMPLE 8

115 parts of glycol diallyl ether made of a copolymer of ethylene oxide and propylene oxide (average molecular weight: about 2300) commercially available under a tradename of Unisafe 50 DUS-230 from Nippon Oil & Fats Co., Ltd., 18 parts of tris-(2-hydroxyethyl)-isocyanurate-tris-$\beta$-mercapto propionate and 2.7 parts of benzoin ethyl ether were stirred and mixed at 60° C. for one hour to obtain a polyene/polythiol type photocurable resin composition (composition B).

The tests were conducted in the same manner as in Example 7 except that composition B was used instead of composition A. The results are shown in Tables 5 and 6.

COMPARATIVE EXAMPLE 6

The tests were conducted in the same manner as in Example 7, except that an acrylate type photocurable resin commercially available under a tradename of Hardrock CRT-1 from Denki Kagaku Kogyo K.K. was used instead of composition A. The results are shown in Tables 5 and 6.

COMPARATIVE EXAMPLE 7

The tests were conducted in the same manner as in Example 7 except that an unsaturated polyester type resin of two pack type (mixing ratio of main component/curing agent: 100/2) commercially available under a tradename of Rigorack F-73MB from Showa Kobunshi Kogyo K.K. was used instead of composition A and heat cured at 80° C. for 90 minutes. The results are shown in Tables 5 and 6.

TABLE 5

| | Results of physical property tests of cured adhesives | | |
|---|---|---|---|
| | Adhesive | Volume resistivity ($\Omega \cdot$ cm) | Spectral transmittance (%) |
| EXAMPLE 7 | Composition A | 6.3 × 10$^8$ | 99 |

TABLE 5-continued

| | Results of physical property tests of cured adhesives | | |
|---|---|---|---|
| | Adhesive | Volume resistivity ($\Omega \cdot$ cm) | Spectral transmittance (%) |
| EXAMPLE 8 | Composition B | 7.0 × 10$^8$ | 98 |
| COMPARATIVE EXAMPLE 6 | Hardrock CRT-1 | 5.0 × 10$^{10}$ | 98 |
| COMPARATIVE EXAMPLE 7 | Rigorack F-73MB | 1.2 × 10$^{11}$ | 97 |

TABLE 6

| | Charged voltages of the front glass of CRT (Unit: KV) | | | |
|---|---|---|---|---|
| | Earthing | | No earthing | |
| | Upon switching on | 10 seconds after switching off | Upon switching on | 10 seconds after switching off |
| EXAMPLE 7 | 12.1 | 0 | 11.7 | 1.8 |
| EXAMPLE 8 | 10.8 | 0 | 11.0 | 1.7 |
| COMPARATIVE EXAMPLE 6 | 23.4 | 17.2 | 23.8 | 17.1 |
| COMPARATIVE EXAMPLE 7 | 24.5 | 18.5 | 24.6 | 19.0 |

As described in the foregoing, the photocurable composition of the present invention provides a cured product having antistatic properties with a volume resistivity of less than 5 × 10$^9$ $\Omega$·cm which has not been accomplished by conventional techniques without impairing the desirable properties of the conventional photocurable resin for glass lamination. Further, the laminated glass product of the present invention having the cured product as an interlayer, prevents various troubles due to static electricity, and very useful for e.g. lamination of a non-reflection glass to the display surface of cathode ray tubes.

We claim:

1. A photocurable resin composition for glass lamination, consisting essentially of a radical polymerizable monomer and a photopolymerization initiator, a cured product of which has a volume resistivity of less than 5 × 10$^9$ $\Omega$·cm, said radical polymerizable monomer comprising a polythiol and a polyene of the formula II

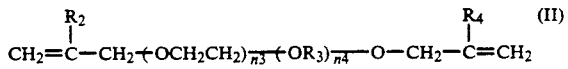

wherein each of $R_2$ and $R_4$ is a hydrogen atom or a methyl group, $R_3$ is an aliphatic bivalent hydrocarbon group having at least three carbon atoms, n3 is an integer of at least 2, n4 is an integer of at least 1, and the average molecular weight of said polyene of formula II is from 500 to 5000.

2. A photocurable resin composition for glass lamination, consisting essentially of a radical polymerizable monomer and a photopolymerization initiator, a cured product of which has a volume resistivity of less than $5 \times 10^9$ Ω·cm, said radical polymerizable monomer comprising a polythiol and a polyene of the formula:

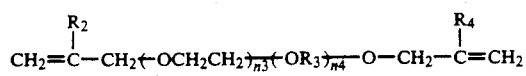

wherein $R_2$ and $R_4$ are both hydrogen, $R_3$ is

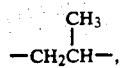

the ratio of n3 to n4 is 1:1 and said polyene has an average molecular weight of about 2300.

* * * * *